(12) United States Patent
Droulez

(10) Patent No.: US 6,688,679 B2
(45) Date of Patent: Feb. 10, 2004

(54) DEVICE FOR ENVELOPING AND FIXING A BUNDLE OF ELECTRICAL CABLES

(75) Inventor: Eric Droulez, Suresnes (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 10/000,491

(22) Filed: Dec. 4, 2001

(65) Prior Publication Data

US 2002/0079122 A1 Jun. 27, 2002

(30) Foreign Application Priority Data

Dec. 21, 2000 (FR) .............................. 00 16796

(51) Int. Cl.[7] .............................................. B62D 25/14
(52) U.S. Cl. ........................... 296/208; 180/90; 439/34; 248/74.2
(58) Field of Search ................. 296/70, 39.1, 39.3, 296/208, 146.7, 214, 191; 180/90; 49/502; 439/34; 248/55, 74.2, 74.3

(56) References Cited

U.S. PATENT DOCUMENTS

| 5,879,047 A | 3/1999 | Yamaguchi et al. |
| 6,092,854 A | 7/2000 | Campbell |

FOREIGN PATENT DOCUMENTS

GB  2 203 598 A  10/1988

Primary Examiner—Joseph D. Pape
(74) Attorney, Agent, or Firm—Ronald Courtney

(57) ABSTRACT

A method and device for enveloping and fixing a bundle of electrical cables. The bundle is inserted into a channel-shaped elongate shell (2) through a longitudinal entry aperture (4) the width of which, at rest, is less than the diameter of the bundle and can be increased by elastic deformation of the shell, the latter itself being inserted into an elongate housing (7) provided in the support, through a longitudinal entry aperture (8) the width of which is less than the outside diameter of the shell at rest. The assembly is particularly useful to support electrical power supplies and the transmission of electrical signals in a motor vehicle.

15 Claims, 2 Drawing Sheets

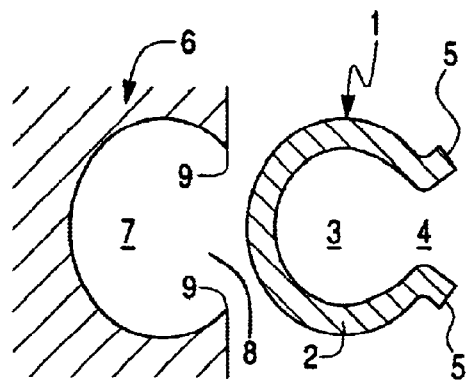
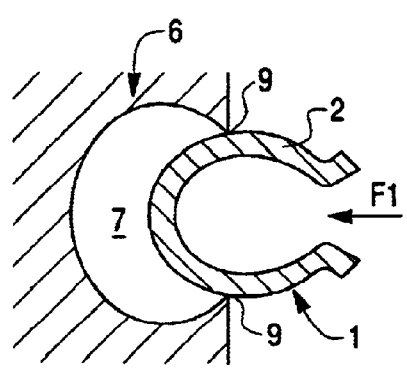
Fig. 1                    Fig. 2
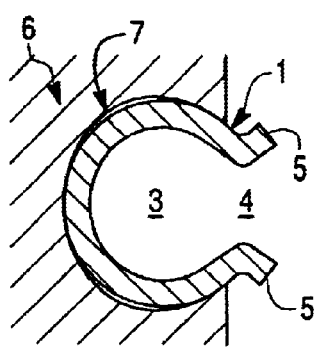
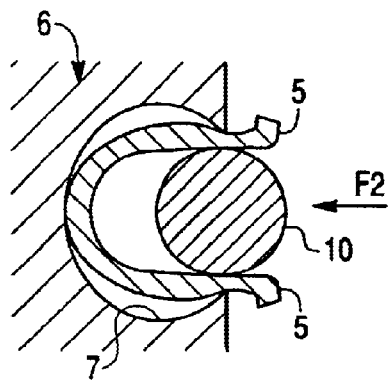
Fig. 3                    Fig. 4
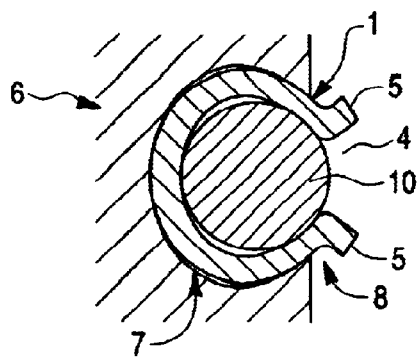
Fig. 5

Fig. 6
Fig. 7
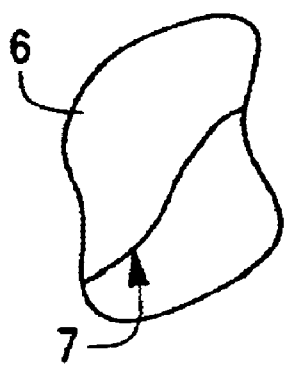
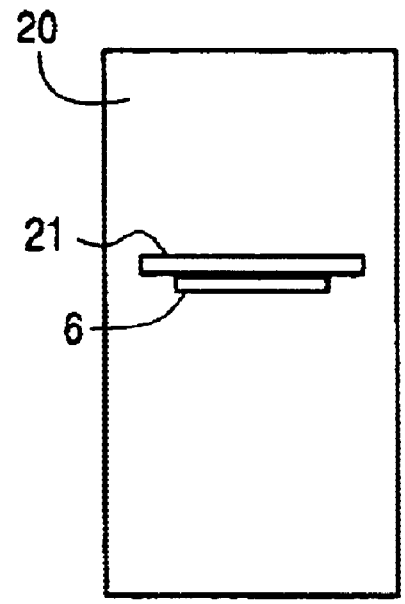

DEVICE FOR ENVELOPING AND FIXING A BUNDLE OF ELECTRICAL CABLES

FIELD OF THE INVENTION

The invention relates to a method and a device for enveloping a bundle of electrical cables and fixing it along an elongate support, especially for the electrical power supply to apparatus and/or the transmission of electrical signals in a motor vehicle.

BACKGROUND OF THE INVENTION

The expression "bundle of electrical cables" designates a set of electrical wires or of cables placed side-by-side or grouped together with one another in such a way as to extend side-by-side along a common path. Generally, each cable or wire is placed beside the others over only a part of its length, and deviates away from them over at least one other part of its length so as to reach elements to be connected electrically. The present invention relates more particularly to the enveloping and the fixing of a set of such side-by-side parts of cables or wires.

In motor-vehicle applications especially, it is necessary to envelop the bundles of cables in order to prevent friction between them and adjacent elements, which is due to vibration and to the movement of the vehicle, causing damage to the cables or wires on the one hand, and causing noise to be emitted on the other hand. This enveloping can be carried out by means of adhesive tapes wound in a spiral around the wires in such a way as to cover them at least partially, and cover them completely in places. Another function of the adhesive tapes is to make the wires of the bundles integral for their mounting and their retention in the vehicle. These adhesive tapes may be expensive, and the taping operation may be expensive in terms of manpower. Moreover, the sound deadening obtained is not always entirely satisfactory.

As to the fixing of the bundle onto its support, which is, for example, the crosspiece supporting the cockpit in the case of a bundle serving to connect equipment of the dashboard of a vehicle, this is achieved by metal or plastic clips distributed along the length of the bundle. This method of fixing is itself also relatively expensive in terms of manpower and does not provide perfect immobilisation of the bundle over its entire length.

SUMMARY OF THE INVENTION

The object of the invention is to remedy these drawbacks.

The invention especially envisages a method of the type defined in the introduction, and makes provision for the bundle to be inserted into an elongate, elastically deformable, channel-shaped shell, through a longitudinal entry aperture, the shell being itself fixed to the support in a position where the width of the said entry aperture is less than the diameter of the bundle.

When the diameter of the bundle varies along the length of the shell, the width of the entry aperture is less than the maximum diameter of the bundle.

Optional characteristics of the invention, which are complementary or alternative, are set out below:

- the shell is fixed to the support before the bundle is inserted into it. Thus the shell can serve as a support for assembling and transporting the wires or cables constituting the bundle, in the various configurations thereof corresponding to the options of the vehicle.
- the bundle is inserted into the shell before the shell is fixed to the support.
- the shell is fixed to the support by inserting it into an elongate housing provided in the support, through a longitudinal entry aperture the width of which is less than the outside diameter of the shell when the shell is surrounding the bundle.
- the said housing is provided in an extruded part of the support.
- the shell features two rims turning away from one another outwards from the edges of its entry aperture respectively, which are suitable for facilitating the elastic dilation of the aperture during the insertion of the bundle and/or for protecting parts of wires moving away from it at their exit from the support.
- the shell is extruded.
- the shell is made of cellular material.
- the shell is made of polyethylene.

A further subject of the invention is a device for implementing the method as defined above, comprising a bundle of electrical cables, an elongate shell in the form of an elastically deformable channel, suitable for receiving the said bundle through a longitudinal entry aperture, and means for fixing the shell along an elongate support, in a position where the width of the said entry aperture is less than the diameter of the bundle.

Advantageously, the means for fixing the shell comprise an elongate housing provided in the support, suitable for receiving the shell through a longitudinal entry aperture the width of which is less than the outside diameter of the shell when the latter is surrounding the bundle.

BRIEF DESCRIPTION OF THE DRAWINGS

The characteristics and advantages of the invention will be set out in more detail in the description below, by referring to the attached drawings.

FIGS. 1 to 4 are diagrammatic views in cross section showing successive stages of the method according to the invention.

FIG. 5 is a view similar to the preceding ones, showing the device according to the invention on completion of the method.

FIG. 6 is a partial depiction of the crosspiece schematically showing a curvilinear housing according to one embodiment of the present invention.

FIG. 7 is a schematic representation of the crosspiece and dashboard in a vehicle according to one embodiment of the present invention.

DESCRIPTION OF THE PREFERRED EMBODIMENTS

FIG. 1 shows, in the rest state, that is to say in the absence of elastic deformation, a shell 1 intended to receive a bundle of electrical cables (not represented) in the method according to the invention. The shell 1 is an extruded component made of polyethylene foam capable of undergoing an elastic deformation both by bending of its wall as well as by compression in the direction of the thickness thereof, by virtue of its porosity. It features an Ω-shaped cross section, the main part 2 of which, defining the body of the shell, is curved over by more than a half-turn so as to delimit a cavity 3 communicating with the outside through a residual aperture or slot 4. The part 2 is connected to two rims 5 going progressively away from one another outwards from the edges of the aperture 4.

FIGS. 1 and 7 also partly shows a crosspiece 6 intended to extend transversely at the front of the passenger compartment of a motor vehicle 20 in order to support the dashboard 21 and/or all or some of the equipment of the cockpit of the vehicle 20. The crosspiece 6 features a longitudinal housing 7 represented in the form of a groove which is produced advantageously in a piece or belonging to it. The wall of the groove 7 is curved over substantially in correspondence with the outer surface of the body 2 of the shell 1, and the groove 7 communicated with the outside through a longitudinal aperture 8 the width of which is less than the maximum width of the groove.

In the stage of the method represented in FIG. 1, the shell 1 is presented facing the aperture 8, the aperture 4 being placed on the opposite side from the latter.

In the stage represented in FIG. 2, the shell 1 is pushed along the arrow F1 in such a way as to cause it to penetrate into the groove 7 through the aperture 8. In the example illustrated, the size of the body 2, at rest, in the direction of the width of the aperture 8 is greater than this width, in such a way that the edges 9 of the aperture 8 bear on the body 2, reducing the width thereof by elastic deformation. At the end of the insertion, as shown in FIG. 3, the shell 1 is relaxed and resumes its initial shape to the extent that the respective dimensions of the shell and of the groove 7 so allow, a residual deformation possibly remaining without impairing the function of the shell.

In the stage represented in FIG. 4, the bundle of cables 10 is presented facing the aperture 4, and it is pushed along the arrow F2 so as to cause it to penetrate within the shell. The pushing force from the bundle spaces away the rims 5 by elastic deformation, and the wall thickness of the shell is locally reduced if necessary, by virtue of the porosity of the shell, when the bundle passes into its maximum diameter through the aperture 8.

As set out above, another way of working consists in mounting the bundle first of all into the shell, then the assembly thus obtained into the support.

The final position is shown in FIG. 5. The bundle 10 is housed in the cavity 3 and comes into contact with the shell 1 along at least three generatrices, the shell itself being in contact with the wall of the groove 7 also along at least three generatrices. This results in positioning of the bundle without any play with respect to the crosspiece 6 in the plane of the figure, that is to say in a plane perpendicular to the longitudinal direction of the bundle. This retention is preferably further reinforced by a radial clamping of the bundle in the shell and of the shell in the groove, by virtue of the elastic deformation of the shell. It is also possible to leave a clearance between the shell and the bundle, the foam wall of the shell preventing any noises from the bundle.

The path of the bundle of cables is not necessarily straight-line. It may equally well be curvilinear and/or in a broken line, especially when the support itself is not straight-line. The housing 7 is then shaped according to the desired path, and the shell is matched to it by elastic deformation.

Although the use of a shell made of foam has been described, that is to say having porous walls, it is also possible to use a shell with a solid wall. In this case, the reduction in thickness mentioned in connection with FIG. 4, if it is necessary, that is to say if the thickness, at rest, of the wall is greater than half of the difference between the width of the aperture 8 and the maximum diameter of the bundle 10, is obtained by displacement of material parallel to the direction of insertion of the bundle. Moreover, in the case in which the width of the shell is not greater, at rest, than the width of the aperture 8, this width is increased by elastic deformation, when the bundle 10 is inserted, in order to prevent the shell and the bundle from coming out of the housing 7.

What is claimed is:

1. Method for fixing a bundle (10) of electrical cables to a support (6) comprising the steps of:
    inserting the bundle into an elastically deformable, channel-shaped shell (2), through a longitudinal entry aperture (4),
    fixing the shell to the support in a position where the width of the entry aperture is less than the diameter of the bundle before the bundle is inserted into said shell, wherein the shell is an extruded elongate component enveloping the bundle, the entry aperture extending in a longitudinal direction of the shell, and the bundle extending along the support which is itself elongate.

2. Method according to claim 1, in which the shell is fixed to the support by inserting it into an elongate housing (7) provided in the support, through a longitudinal entry aperture (8) the width of which is less than the outside diameter of the shell when the shell is surrounding the bundle (10).

3. Method according to claim 2, in which the housing is provided in an extruded part of the support.

4. Method according to claim 1, in which the shell features two rims (5) turning away from one another outwards from the edges of its entry aperture (4) respectively, which are suitable for facilitating the elastic dilation of the aperture during the insertion of the bundle and/or for protecting parts of wires moving away from it at their exit from the support.

5. Method according to claim 1, in which the shell is made of cellular material.

6. Method according to claim 1, in which the shell is made of polyethylene.

7. Device for implementing the method according to claim 1, comprising a bundle of electrical cables (10), an elongate shell (2) in the form of an elastically deformable channel, suitable for receiving the bundle through a longitudinal entry aperture (4), and means for fixing the shell along an elongate support (6), in a position where the width of the entry aperture is less than the diameter of the bundle.

8. Device according to claim 7, in which the means for fixing the shell comprise an elongate housing (7) provided in the support, suitable for receiving the shell through a longitudinal entry aperture (8) the width of which is less than the outside diameter of the shell when the latter is surrounding the bundle (10).

9. A method for fixing a bundle of electrical cables to a support (6), said method comprising the following steps;
    providing an elastically deformable channel shaped shell formed as an elongated component having a longitudinally extending aperture for receiving said bundle;
    providing a an elongated housing in said support adapted to receive said shell;
    inserting said shell within said elongated housing of said support;
    inserting said bundle within said shell such that said shell substantially envelops said bundle along a length of said elongated shell; and
    wherein said bundle is disposed within said shell and said housing substantially along a common path between said housing and said shell is inserted within the elongated housing prior to the step of inserting said bundle within said shell.

10. A method for fixing a bundle of electrical cables to a support (6), said method comprising the following steps;

providing an elastically deformable channel shaped shell formed as an elongated component having a longitudinally extending aperture for receiving said bundle;

providing an elongated housing in said support adapted to receive said shell;

inserting said shell within said elongated housing of said support;

inserting said bundle within said shell such that said shell substantially envelops said bundle along a length of said elongated shell; and wherein said bundle is disposed within said shell and said housing substantially along a common path between said housing and said step of providing an elongated housing in said support includes providing a curvilinear shaped housing in said support, whereby after said steps of inserting said shell within said housing and said step of inserting said bundle within said shell, said bundle and said shell are disposed within said housing substantially along a length of said curvilinear shaped housing.

11. The method according to claim 9 wherein said step of providing an elastically deformable channel shaped shell includes forming a pair of outwardly extending rims disposed on opposite sides of said longitudinally extending aperture, and installing said shell within said housing such that said rims remain exposed and disposed outside said housing when said shell and bundle are disposed within said housing.

12. An assembly for supporting a bundle of wires within a support, said assembly comprising:

an elastically deformable channel shaped shell formed as an elongated component having a longitudinally extending aperture for receiving said bundle;

an elongated housing formed in said support provided to receive said shell and said bundle;

wherein said bundle is disposed within said shell and said housing; and said bundle, shell and housing all extend substantially along a common path between said housing and shell and said shell further includes a pair of outwardly extending rims disposed on opposite sides of said longitudinally extending aperture, said rims being exposed and disposed outside said housing when said shell and bundle are disposed within said housing.

13. The assembly according to claim 12, wherein said common path is a straight line.

14. The assembly according to claim 12, wherein said common path forms a curvilinear line.

15. An assembly for supporting a bundle of wires within a support, said assembly comprising:

an elastically deformable channel shaped shell formed as an elongated component having a longitudinally extending aperture for receiving said bundle;

an elongated housing formed in said support provided to receive said shell and said bundle;

wherein said bundle is disposed within said shell and said housing; and said bundle, shell and housing all extend substantially along a common path between said housing and shell, and said support is a crosspiece structural support extending transversely across a front portion of a passenger compartment of a vehicle and supporting a dashboard within said vehicle.

* * * * *